United States Patent [19]

Slack et al.

[11] Patent Number: 5,567,793

[45] Date of Patent: Oct. 22, 1996

[54] URETHANE-FREE, DIPHENYLMETHANE DIISOCYANATE PREPOLYMERS AND PROCESS FOR THEIR PRODUCTION

[75] Inventors: William E. Slack, Moundsville, W. Va.; David D. Steppan, Gibsonia, Pa.

[73] Assignee: Bayer Corporation, Pittsburgh, Pa.

[21] Appl. No.: 471,551

[22] Filed: Jun. 6, 1995

[51] Int. Cl.$^6$ .................................................. C08G 18/71
[52] U.S. Cl. .................. 528/69; 252/182.2; 252/182.22; 560/27; 528/56; 528/64
[58] Field of Search .......................... 252/182.2, 182.22; 528/69, 67, 56; 560/27

[56] References Cited

U.S. PATENT DOCUMENTS

| | | | |
|---|---|---|---|
| 3,644,457 | 2/1972 | König et al. | 260/453 SP |
| 3,839,293 | 10/1974 | Knopf et al. | 528/68 |
| 4,055,548 | 10/1977 | Carleton et al. | 260/77.5 AT |
| 4,115,429 | 9/1978 | Reiff et al. | 260/453 SP |
| 4,118,411 | 10/1978 | Reiff et al. | 260/453 SP |
| 4,160,080 | 7/1979 | König et al. | 528/59 |
| 4,261,852 | 4/1981 | Carroll et al. | 528/59 |
| 4,490,300 | 12/1984 | Allen et al. | 260/453 SP |
| 4,738,991 | 4/1988 | Narayan | 521/124 |
| 4,866,103 | 9/1989 | Cassidy et al. | 521/159 |
| 5,319,053 | 6/1994 | Slack et al. | 528/48 |
| 5,319,054 | 6/1994 | Slack et al. | 528/48 |

FOREIGN PATENT DOCUMENTS

| | | |
|---|---|---|
| 48-62745 | 9/1973 | Japan. |
| 994890 | 6/1965 | United Kingdom. |

*Primary Examiner*—James J. Seidleck
*Assistant Examiner*—Rachel Johnson
*Attorney, Agent, or Firm*—Joseph C. Gil; N. Denise Brown

[57] ABSTRACT

Allophanate-modified MDI which is a storage stable liquid at 25° C. is produced in two steps. First, a monoisocyanate is reacted with an organic material having about 1.8 or more hydroxyl groups and a molecular weight of from about 60 to about 6,000 to form the urethane. The urethane is then reacted with an isomeric mixture of MDI in an amount such that the resultant isocyanate will have an NCO content of from about 3 to about 28%. The isomeric mixture of diphenylmethane diisocyanate contains from about 0 to about 60% by weight 2,4'-diphenylmethane diisocyanate, less than 6% by weight 2,2'-MDI and the remainder 4,4'-MDI. The prepolymers of this invention are particularly useful in reaction injection molding processes because molded articles having improved flex modulus are obtained.

11 Claims, No Drawings

URETHANE-FREE, DIPHENYLMETHANE DIISOCYANATE PREPOLYMERS AND PROCESS FOR THEIR PRODUCTION

BACKGROUND OF THE INVENTION

The present invention relates to liquid, urethane-free, allophanate-modified, diphenylmethane diisocyanates (MDI) and to processes for their production and use.

Liquid diphenylmethane diisocyanates are generally known in the art. U.S. Pat. No. 3,644,457, for example, discloses room temperature, stable, liquid isocyanates derived from one mole of diphenylmethane diisocyanate and 0.1 to 0.3 moles of poly-1,2-propylene ether glycol.

U.S. Pat. No. 4,055,548 discloses liquid isocyanate prepolymer compositions obtained by reacting polymethylene polyphenylisocyanate containing from about 65 to 85 percent by weight of methylene bis-phenylisocyanate with a polyoxyethylene glycol having molecular weight of from 200 to 600 in an equivalent ratio of 0.0185 to 0.15:1.

U.S. Pat. Nos. 4,115,429 and 4,118,411 disclose low temperature (i.e., down to −5° C.), storage stable liquid diphenylmethane diisocyanates which are produced by reacting diphenylmethane diisocyanates having a specified 2,4'-isomer content with propylene glycol or poly-1,2-propylene ether glycol.

U.S. Pat. No. 4,261,852 discloses liquid polyisocyanate compositions made up of 50 to 90% by weight of a reaction product of diphenylmethane diisocyanate and a polyoxypropylene diol or triol (hydroxyl equivalent weight of from 750 to 3000) having an NCO content of from 8 to 26% by weight, from about 10 to 50% by weight of a diphenylmethane diisocyanate containing from 30 to 65% by weight of diphenylmethane diisocyanate, the remainder being polymethylene polyphenyl polyisocyanate.

U.S. Pat. No. 4,490,300 discloses room temperature stable, liquid isocyanates made by reacting diphenylmethane diisocyanate with an aliphatic diol having a pendant aromatic group (e.g., 2-methyl-2-phenyl- 1,3-propanediol or phenyl-1,2-ethanediol).

U.S. Pat. No. 4,738,991 discloses organic polyisocyanates characterized by allophanate linkages which are prepared by reacting an organic polyisocyanate, including 2,4'- and 4,4'-methylenediphenyl diisocyanate, with poly- or monohydric alcohol in the presence of an organo metallic catalyst. The catalyst is deactivated upon completion of the reaction using a compound such as an inorganic acid, organic acid, organic chloroformate or an organic acid chloride.

U.S. Pat. No. 4,866,103 discloses a polyisocyanate composition useful for producing elastomers in a RIM process. These polyisocyanate compositions are the reaction product of an alcohol and/or thiol (average functionality of from about 1.5 to about 4 and average equivalent weight of at least 500) with at least 2 equivalents per hydroxyl and/or thiol equivalent of an organic polyisocyanate (including 4,4'- and 2,4'-isomers of diphenylmethane diisocyanate) under conditions such that at least about 20% of the initially formed urethane and/or thiourethane groups are converted to allophanate and/or thioallophanate groups.

Other prior art relating to the preparation of allophanates which contain isocyanates includes British Patent 994,890. This patent discloses reaction of urethane isocyanates with excess diisocyanate either by application of heat alone or by heating in the presence of a catalyst such as a metal carboxylate, a metal chelate or a tertiary amine, until the isocyanate content is reduced to the theoretical level (i.e., that which is obtained theoretically when complete reaction of the urethane groups is achieved).

U.S. Pat. No. 4,160,080 discloses a process for producing allophanates containing aliphatically and/or cycloaliphatically bound isocyanate groups. In the disclosed process, compounds containing urethane groups are reacted with polyisocyanates having aliphatic and/or cycloaliphatic isocyanate groups in the presence of a strong acid. The process is generally conducted at a temperature of from 90° C. to 140° C. for about 4 to 20 hours.

Japanese Patent Application No. 1971-99176 discloses a method for preparing liquid diphenylmethane diisocyanate by reacting diphenylmethane diisocyanate with aliphatic monovalent alcohol.

U.S. Pat. No. 5,319,053 is directed to a stable, liquid MDI prepolymer. This liquid prepolymer comprises an alcohol-based, allophanate modified MDI having an isocyanate content of about 12 to 32.5% and is characterized in that the allophanate is a reaction product of an aliphatic alcohol and a specified isomer composition of MDI containing from 2 to 60% of the 2,4'-isomer, less than 6% of the 2,2'-isomer, and the balance is the 4,4'-isomer.

It is also possible according to another embodiment in U.S. Pat. No. 5,319,053 that this stable, liquid MDI prepolymer has an isocyanate content of 5 to 30%. In this embodiment, the prepolymer comprises the reaction product of the allophanate described above, and an organic material containing at least two active hydrogen groups, and/or a low molecular weight diol. The organic material containing active hydrogen groups may be one wherein these groups are hydroxyl groups, primary amine groups, secondary amine groups, or combinations thereof.

Copending application Ser. No. 08/116,141, filed on Sep. 2, 1993, which is commonly assigned, discloses that RIM processing of the stable, liquid MDI prepolymers described in U.S. Pat. No. 5,319,053 yields molded products which exhibit a high flex modulus. These stable, liquid MDI prepolymers contain allophanate groups and possibly urethane groups.

U.S. Pat. No. 5,319,054 discloses a process for the production of liquid methylene diphenyl diisocyanates in which one equivalent of a diisocyanate is reacted with one equivalent of an aliphatic alcohol to form a diurethane. The diurethane is then reacted with an isomeric mixture of diphenylmethane diisocyanate in an amount sufficient to generate an allophanate having an isocyanate group content of from about 12 to about 30%.

SUMMARY OF THE INVENTION

It is an object of the present invention to provide novel, liquid, urethane-free, allophanate-modified diphenylmethane diisocyanate prepolymers.

It is another object of the present invention to provide a process for the production of these urethane-free, allophanate-modified diphenylmethane diisocyanate prepolymers.

It is another object of the present invention to provide RIM elastomers having improved flex modulus and a process for their production.

These and other objects which will be apparent to those skilled in the art are accomplished by reacting a monoisocyanate with an organic compound having about 1.8 or more hydroxyl groups and a molecular weight of from about 60 to about 6,000 in amounts such that the reaction product will include urethane groups and possibly unreacted hydroxyl groups. This reaction product is then further reacted with a specified isomer composition of diphenylmethane diisocyanate in an amount sufficient to provide a liquid, urethane-free, allophanate-modified MDI prepolymer having an NCO content of about 3.0 to 28.0%. Typically, the diphenylmethane diisocyanate isomer composition contains from about 0 to about 60% by weight 2,4'-diphenylmethane diisocyanate, less than 6% by weight 2,2'-MDI and the remainder 4,4'-MDI.

These urethane-free, allophanate-modified MDI prepolymers obtained from the above process are useful in the production of RIM elastomers having improved flex modulus. Such RIM elastomers are produced in accordance with techniques known to those skilled in the art.

It is a distinct feature of the present invention that the liquid, urethane-free, allophanate-modified MDI prepolymers are stable and liquid at 25° C. As used herein, the term "stable" means that the NCO content of the isocyanate does not change more than one percent absolute and the viscosity does not change more than ten percent when stored at 25° C. for 3 months. As used herein, the term "liquid" means that the modified isocyanate does not precipitate solids when stored at 25° C. for 3 months.

The prepolymers of the present invention are particularly useful in automotive reaction injection molding (RIM), shoe soles and rigid foam applications.

DETAILED DESCRIPTION OF THE INVENTION

The present invention relates to urethane-free, allophanate-modified MDI prepolymers which are storage stable and liquid at 25° C. and have an isocyanate content of from about 3 to about 28%, preferably from about 8 to about 23% and to a process for the production of these urethane-free, allophanate-modified MDI prepolymers.

The present invention also relates to reaction injection molded (RIM) elastomers produced from these urethane-free, allophanate-modified MDI prepolymers.

The urethane-free, allophanate-modified MDI prepolymers may be prepared by reacting a monoisocyanate with an organic compound having about 1.8 or more hydroxyl groups and a molecular weight of from about 60 to about 6,000 in order to produce a urethane. The urethane is then reacted with an isomer mixture of MDI satisfying specified compositional requirements to form the allophanate.

Any of the known monoisocyanates may be used to produce urethanes in accordance with the present invention. Specific examples of suitable monoisocyanates include: phenyl isocyanate, 2,6-dimethyl-phenyl isocyanate, cyclohexyl isocyanate, the isomeric tolyl isocyanates, the isomeric xylyl isocyanates, and hexyl isocyanate. Phenyl isocyanate, 2,6-dimethyl-phenyl isocyanate, o- and p-tolyl isocyanates and cyclohexyl isocyanate are particularly preferred.

The organic compounds containing about 1.8 or more hydroxyl groups and having molecular weights of from about 60 to about 6000 useful in the production of urethanes in accordance with the present invention include: diols, polyester polyols, polyether polyols, polyhydroxy polycarbonates, polyhydroxy polyacetals, polyhydroxy polyacrylates, polyhydroxy polyester amides, polyhydroxy polythioethers, etc. Of these, the diols, polyester polyols, polyether polyols, and polyhydroxy polycarbonates are preferred.

Suitable polyester polyols include reaction products of polyhydric (preferably dihydric alcohols to which trihydric alcohols may be added) and polybasic (preferably dibasic) carboxylic acids. Polycarboxylic acids, the corresponding carboxylic acid anhydrides and polycarboxylic acid esters of lower alcohols and mixtures thereof may also be used to prepare the polyesters. The polycarboxylic acids may be aliphatic, cycloaliphatic, aromatic and/or heterocyclic and they may be substituted, e.g. by halogen atoms, and/or unsaturated. Specific examples of suitable polycarboxylic acids and derivatives thereof include: succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dimeric and trimeric fatty acids such as oleic acid, which may be mixed with monomeric fatty acids; dimethyl terephthalates and bis-glycol terephthalate.

Suitable polyhydric alcohols include: ethylene glycol; 1,2- and 1,3-propylene glycol; 1,3-and 1,4-butylene glycol; 1,6-hexanediol; 1,8-octanediol; neopentyl glycol; cyclohexanedimethanol; 1,4-bis(hydroxymethylcyclohexane); 2-methyl-1,3-propanediol; 2,2,4-trimethyl-1,3-pentanediol; triethylene glycol; tetraethylene glycol; polyethylene glycol; dipropylene glycol; polypropylene glycol; dibutylene glycol; polybutylene glycol; glycerine; and trimethylolpropane. The polyester polyol may also contain a portion of carboxyl end groups. Polyesters of lactones (e.g., ε-caprolactone) or hydroxyl carboxylic acids (e.g., ω-hydroxycaproic acid) may also be used.

Any of the known polycarbonates containing hydroxyl groups may be used in the practice of the present invention. Such polycarbonates are generally produced by reacting a diol (e.g., 1,3-propanediol, 1,4-butanediol, 1,6-hexanediol, diethylene glycol, triethylene glycol and tetraethylene glycol) with phosgene, a diarylcarbonate such as diphenylcarbonate or with a cyclic carbonate such as ethylene or propylene carbonate. Polyester carbonates obtained by reacting a polyester or polylactone with phosgene, a diaryl carbonate or a cyclic carbonate are also suitable.

Any of the known polyether polyols having a functionality of about 1.8 or more, preferably at least 2, most preferably from 2 to 4, and a molecular weight of from about 60 to about 6,000 may be used in the process of the present invention. These may be high molecular weight organic compounds, low molecular weight organic compounds, or mixtures thereof.

Suitable such polyether polyols may be produced by reacting a starting compound which contains reactive hydrogen atoms with one or more alkylene oxides (e.g., ethylene oxide, propylene oxide, butylene oxide, styrene oxide, tetrahydrofuran, epichlorohydrin or mixtures of these alkylene oxides) in accordance with techniques known to those skilled in the art. Polyether polyols which do not contain more than about 10% by weight of ethylene oxide units are preferred. Polyethers produced without the addition of ethylene oxide are particularly preferred. Suitable starting compounds containing reactive hydrogen atoms from which polyether polyols may be produced include: the polyhydric alcohols set forth for preparing polyester polyols, water, methanol, ethanol, 1,2,6-hexane triol, 1,2,4-butane triol, trimethylol ethane, pentaerythritol, mannitol, sorbitol, methyl glycoside, sucrose, phenol, isononyl phenol, resorcinol, hydroquinone, and 1,1,1- or 1,1,2-tris-(hydroxyl phenyl)ethane.

Polyethers modified by vinyl polymers may also be used in the process of the present invention. Suitable modified polyethers may be produced by polymerizing a material such as styrene and/or acrylonitrile in the presence of a polyether. (See, e.g., U.S. Pat. Nos. 3,383,351; 3,304,273; 3,523,095; 3,110,695 and German Patent No. 1,152,536).

Polythioethers which are useful in the process of the present invention include the condensation products obtained from thiodiglycol on its own and/or with other glycols, dicarboxylic acids, formaldehyde, aminocarboxylic acids or amino alcohols. These condensation products are polythio-mixed ethers, polythioether esters or polythioether ester amides, depending on the co-components.

Polyacetals which may be used in the process of the present invention include those compounds prepared from aldehydes (e.g., formaldehyde) and glycols (e.g., diethylene glycol, triethylene glycol, ethoxylated 4,4'-dihydroxydiphenyldimethylmethane, and 1,6-hexanediol). Suitable polyacetals may also be prepared by polymerizing cyclic acetals.

Polyhydroxy polyester amides and polyamines which may be used in the process of the present invention include the predominantly linear condensates obtained from polybasic saturated and unsaturated carboxylic acids or their anhydrides and mixtures thereof.

Suitable hydroxy-functional polyacrylates may be produced from monomers such as acrylic acid, methacrylic acid, crotonic acid, maleic anhydride, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, glycidyl acrylate, glycidyl methacrylate, 2-isocyanatoethyl acrylate and 2-isocyanatoethyl methacrylate.

Lower molecular weight compounds having about 2 or more hydroxyl groups and an average molecular weight of from about 60 to about 200 may be used in the process of the present invention either alone or in combination with higher molecular weight isocyanate-reactive compounds having a functionality of at least about 1.8 and a molecular weight no greater than 6,000. It is also possible to use the higher molecular weight materials alone in the process of the present invention.

Some useful low molecular weight materials include, for example, the polyhydric alcohols which have previously been described for the preparation of the polyester polyols and polyether polyols having molecular weights of from 60 to 200. Dihydric alcohols are preferred. The weight ratio of the low molecular weight to the high molecular weight material containing two or more hydroxyl groups can be from about 0.01 to about 0.50, preferably from about 0.05 to about 0.20.

In the reaction of the monoisocyanate with the compound having about 1.8 or more hydroxyl groups and a molecular weight of from about 60 to about 6,000, the NCO to OH equivalent ratio may be from about 0.8 to about 1.2, preferably from about 0.9 to about 1.1, most preferably about 1.0. The reaction of monoisocyanate and hydroxyl compound to form the urethane is monitored until at least about 90% of the stoichiometrically limiting component reacts.

Solvents which are typically inert to the isocyanate, for example, toluene, tetrahydrofuran, o-dichlorobenzene or the like may be employed in the process of the present invention.

The urethane obtained by reacting the monoisocyanate with the hydroxyl compound is then reacted with the isomer composition of diphenylmethane diisocyanate in an amount sufficient to provide an allophanate having an isocyanate group content of from about 3.0 to about 28.0%, preferably from about 8.0 to about 23.0%. The isomer composition of the diphenylmethane diisocyanate is made up of from about 0 to about 60% (preferably from about 2 to about 30%) by weight 2,4'-diphenylmethane diisocyanate, less than 6% (preferably from about 0 to about 1.0%) by weight 2,2'-diphenylmethane diisocyanate, with the remainder being 4,4'-diphenylmethane diisocyanate.

The allophanate-forming reaction may be conducted in the presence of a catalyst. Useful catalysts are those which can be neutralized or otherwise stopped from adversely catalyzing subsequent reactions. Specific examples of useful catalysts include: zinc acetylacetonate, zinc 2-ethylhexanoate, cobalt 2-ethylhexanoate, cobalt naphthanate, lead linoresinate and stannous octoates. Zinc acetyl acetonate, and stannous octoate are preferred catalysts. Examples of catalyst stoppers include acidic materials such as anhydrous hydrochloric acid, sulfuric acid, benzoyl chloride, Lewis acids, and bis(2-ethylhexyl) phosphate. Benzoyl chloride, and bis(2-ethylhexyl) phosphate are preferred catalyst stoppers. A ratio of 2 equivalents of catalyst stopper to each mole of catalyst ensures that the catalyst is deactivated.

In a preferred embodiment of the process of the invention, the allophanate can be prepared by reacting the monoisocyanate with an organic compound having about 1.8 or more hydroxyl groups and a molecular weight of from about 60 to about 6000 at a temperature of from about 60° to about 150° C., preferably from about 80° to about 120° C. The resultant urethane may then be dissolved in the specified MDI isomer composition and converted to an aliophanate modified MDI by heating to a temperature of from about 60° to about 120° C. in the presence of zinc acetylacetonate as catalyst, and benzoyl chloride as the catalyst deactivator. It is preferred that the catalyst and catalyst deactivator be used in amounts such that the equivalent ratio of deactivator to catalyst is from about 1 to about 3, preferably about 2.

In addition to the above-mentioned isocyanate-reactive components which are preferably difunctional, trifunctional and higher functional components generally known in polyurethane chemistry, such as trimethylolpropane, may be used.

The allophanate-modified MDI produced directly from the urethane is a liquid isocyanate prepolymer having an isocyanate group content of from about 3 to about 28%, preferably from about 8 to about 23%. This type of liquid isocyanate prepolymer has been found to be particularly useful in the preparation of isocyanate reaction products such as polyurethanes.

The allophanate-modified MDI compositions of the present invention may be further combined with one or more isocyanate-reactive compounds, a catalyst and any of the other known additives and processing aids which are known to be useful in RIM processes. This reactive mixture may then be molded in accordance with known reaction injection molding techniques.

Isocyanate-reactive compounds useful for producing the reactive mixture to be molded include those described above as being useful for the production of the urethane-free, aliophanate-modified MDI. These suitable isocyanate-reactive materials include, for example, the polyethers, polyesters, polythioethers, polyacetals, polycarbonates, amine terminated polyethers, aminopolyethers, polymer polyols, PHD polyols, or the so-called filled polyols. These compounds may have molecular weights of from about 500 to 10,000 and contain from 1 to 4 isocyanate-reactive groups of the type known for the production of polyurethanes.

Other isocyanate-reactive compounds useful for producing the reactive mixture to be molded include, for example, low molecular weight chain extenders. These compounds generally have molecular weights of from about 60 to 500, preferably from 61 to 400, and may contain either hydroxyl groups or amino groups which are reactive with the isocyanate. Suitable compounds include, for example, organic diols and triols, organic primary amines and secondary amines, aminoalcohols, etc. Particularly preferred chain extenders include 1-methyl-3,5-diethyl-2,4-phenyl diamine, 1-methyl-3,5-diethyl-2,6-phenyl diamine, and mixtures thereof.

Catalysts which may be used to produce RIM articles in accordance with the present invention include, for example, the tertiary amines, silylamines having carbon-silicon bonds, basic nitrogen compounds, and organic metal compounds such as, for example, organic tin compounds. Some suitable examples of these include those described in, for example, U.S. Pat. No. 5,198,522, the disclosure of which is herein incorporated by reference.

Other additives and processing aids which may optionally be included in the reactive mixture to molded articles include surface-active additives such as, for example, emulsifiers and foam stabilizers, reaction retarders, cell regulators, pigments, dyes, flame-retarding agents, internal mold release agents, stabilizers against ageing and weathering, plasticizers, fungistatic and bacteriostatic substances, and fillers. Suitable examples of these may be found in U.S. Pat. No. 5,198,522, the disclosure of which is herein incorporated by reference, and in Kunstoff-Handbuch, Volume VII, published by Vieweg and Hochtlen, Carl-Hanser-Verlag, Munich 1966, on pages 103 to 113.

Any of the known RIM processes may be used to produce molded articles from reaction mixtures containing the allophanate-modified compositions of the present invention. Such processes are disclosed, for example, in U.S. Pat. No. 5,198,522, the disclosure of which is herein incorporated by reference.

When carrying out the process of the present invention, the quantity of prepolymer should preferably be such that the isocyanate index is from about 80 to about 120 in the reaction mixture. By "isocyanate index" is meant that the quotient of the number of isocyanate groups divided by the number of isocyanate-reactive groups, multiplied by 100. When calculating the isocyanate index, any isocyanate-reactive groups possibly present in the mold release agents (e.g. carboxyl groups) are not taken into account.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Examples 1–13 relate to the production of MDI isocyanate prepolymers. The following materials were used in the production of these isocyanate prepolymers:

POLYOL A: A propylene glycol/propylene oxide adduct having an OH number of about 56 and a functionality of about 2.

POLYOL B: A glycerine/propylene oxide/ethylene oxide adduct terminated with 17% by weight ethylene oxide having an OH number of about 35 and a functionality of about 3.

POLYOL C: A propylene glycol/propylene oxide adduct having an OH number of about 264 and a functionality of about 2.

PG: 1,2-Propylene glycol.

1,3-B: 1,3-Butanediol.

DPG: Dipropylene glycol.

TPG: Tripropylene glycol.

T-12: Di-n-butyltin dilaurate.

ZnAcAc: Zinc acetylacetonate.

MDI-x: Diphenylmethane diisocyanate which contains less than 6% by weight 2,2'-MDI and in which x represents the percent by weight 2,4'-MDI and 100%-x represents the percent by weight 4,4'- and 2,2'-MDI.

Example 1

23.5 parts phenyl isocyanate and 42.0 parts POLYOL C were charged to a reactor equipped with a stirrer and heated with stirring to 60° C. 100 ppm T-12 were then added to the reactor and the contents of the reactor were maintained at 60°–70° C. for 6 hours. A viscous liquid having a strong urethane peak in the infrared scan was obtained.

152 parts MDI-2 were added to this viscous liquid. The temperature of the mixture was then raised to 90° C. 0.033 parts ZnAcAc were then added and the contents of the reactor were maintained at 90° C. for 1 hour. The NCO content of the reaction mixture after this 1 hour was 19.4%. 0.13 parts benzoyl chloride were then added to the reactor and the contents of the reactor were cooled to 25° C. The allophanate-modified MDI product was a clear liquid having an NCO content of 19.4%. This product was storage stable at 25° C.

Examples 2–11

The procedure of Example 1 was repeated using the monoisocyanate, hydroxyl compound and MDI listed in Table 1 in the amounts listed in Table 1. T-12, ZnAcAc and benzoyl chloride were used in each of these Examples in the same amount as was used in Example 1. A clear liquid product which was storage stable at 25° C. was obtained in each of these Examples. The NCO content of the product of each Example is reported in Table 1.

TABLE 1

| EX. | Mono-NCO/ pbw | OH-Compd/ pbw | MDI-2/pbw | % NCO |
|---|---|---|---|---|
| 2 | phenyl-isocyanate/ 23.5 | TPG/19.0 | 152.4 | 22.0 |
| 3 | phenyl-isocyanate/ 23.5 | DPG/13.2 | 152.4 | 22.1 |
| 4 | phenyl-isocyanate/ 23.5 | PG/7.5 | 152.4 | 23.4 |
| 5 | 2,6-dimethyl-phenyl iso-cyanate/ 29.0 | DPG/13.2 | 152.4 | 20.7 |
| 6 | 2,6-dimethyl-phenyl iso-cyanate/ 29.0 | TPG/19.0 | 152.4 | 20.4 |
| 7 | 2,6-dimethyl-phenyl iso- | POLYOL C/ 42.0 | 152.4 | 18.2 |

TABLE 1-continued

| EX. | Mono-NCO/ cyanate/ pbw | OH-Compd/ pbw | MDI-2/pbw | % NCO |
|---|---|---|---|---|
|  | cyanate/ 29.0 |  |  |  |
| 8 | 2,6-diisopropylphenyl isocyanate/ 53.6 | 1,3-B/11.9 | 203.2 | 21.1 |
| 9 | 2,6-dimethylphenyl isocyanate/ 6.5 | POLYOL A/ 36.5 POLYOL B/ 12.7 | 44.3 | 12.9 |
| 10 | phenyl isocyanate/ 10.9 | 1,3-B/2.68 POLYOL A/ 26.4 POLYOL B/ 8.54 | 51.5 | 13.0 |
| 11 | 2,6-dimethylphenyl isocyanate/ 13.2 | 1,3-B/2.63 POLYOL A/ 25.9 POLYOL B/ 8.4 | 49.8 | 13.0 |

Example 12 (urethane prepolymer not in accordance with the invention)

44.3 parts of MDI-2 were charged to a reactor equipped with a stirrer. To this stirred MDI at 60° C. was added 24.7 parts POLYOL A and 31.2 parts POLYOL B. This reaction mixture was maintained at 60° C. for 2 hours and then cooled to 25° C. The product had an isocyanate content of 13.1%.

Example 13 (urethane prepolymer; not in accordance with the invention)

53.0 parts of MDI-2 were charged to a reactor equipped with a stirrer. To this stirred MDI at 60° C. was added 3.35 parts of 1,3-B, 33.0 parts POLYOL A and 10.7 parts POLYOL B. This reaction mixture was maintained at 60° C. for 2 hours and then cooled to 25° C. The product had an isocyanate content of 13.0%.

Examples 14–28

Examples 14–28 are RIM examples. The allophanate modified prepolymers prepared in accordance with Examples 9–11 were used to produce reaction injected molded articles. The isocyanates prepared in Examples 12 and 13 (not in accordance with the invention) were also used to produce reaction injected molded articles. The RIM examples based on the isocyanates in these examples (12 and 13) are for comparative purposes. More specifically, RIM examples based on Example 12 above are comparative to RIM examples based on the prepolymer prepared in Example 9 above. Similarly, RIM examples based on Example 13 above are comparative to RIM examples based on the prepolymers prepared in Examples 10 and 11 above.

The specific materials and the amounts of those materials used in the RIM examples are reported in Tables 2–7. A description of the materials is set forth hereinbelow. The polyurethane-forming system was injected using a Hennecke RIMDOMAT RIM machine. The isocyanate-reactive materials and various additives were put into the B-side of the machine and the appropriate quantities of the specific isocyanate to achieve an isocyanate index of 105 was loaded into the A-side. The RIMDOMAT was equipped with a Hennecke mq8 Mixhead. The B-side was preheated to 40° to 45° C. and the A-side was heated to 40° to 45° C. The materials were injected at a 105 isocyanate index at an injection pressure of 200 bar and an injection rate of 200 grams/sec. The material was injected into a flat plaque mold of 3×200×300 mm heated to 65° C., and sprayed with Chemtrend 2006 mold release spray. After a 30 second dwell time, the part was demolded. Physical properties were determined in accordance with ASTM standards.

The following components were used in the RIM examples.

POLYOL D: a glycerol started polyether of propylene oxide and ethylene oxide (83 wt % PO and 17 wt % EO) having an OH number of 35, a functionality of about 3, and a primary OH content of approximately 90% based on the total OH content of the polyether polyol.

AMINE A: a propoxylated ethylene aliamine having an OH number of 630 and a functionality of 4.

POLYOL E: a polyester having an OH number of 51, and based on oleic acid, adipic acid and pentaerythritol in about a 6:2:3 molar ratio.

IMR A: a blend of zinc stearate and Amine A in a 2:3 weight ratio, and having an OH number of 378.

DETDA: an 80:20 mixture of 1-methyl-3,5-diethyl-2,4- and 2,6-phenyl diamine.

L-5304: a silicone surfactant available from Union Carbide Corp.

UL-28: dimethyl tin dilaurate.

Dabco 33-LV: 33 wt % of triethylene diamine in dipropylene glycol having an OH number of 559

The following ASTM methods used were as follows:

D790 flexural modulus
D412 tensile strength and elongation
D624 die C tear strength The properties of the molded article are reported in Table 2.

TABLE 2

| Example | 14 | 15 |
|---|---|---|
| B-Side |  |  |
| DETDA | 30 | 30 |
| POLYOL E | 3.8 | 3.8 |
| IMR A | 3 | 3 |
| L-5304 | 0.4 | 0.4 |
| AMINE A | 1.7 | 1.7 |
| POLYOL D | 60.5 | 60.5 |
| UL-28 | 0.3 | 0.3 |
| Dabco 33-LV | 0.1 | 0.1 |
| A-SIDE |  |  |
| ISO | 12 | 9 |
| NCO Index | 105 | 105 |
| Moles Urethane/ 100 g | 0.0442 |  |
| Moles Allophanate/ 100 g |  | 0.0442 |
| Props. of Molded Article |  |  |
| Flex Mod. at rm. temp., (lb/in²) | 22,000 | 32,000 |

TABLE 2-continued

| Example | 14 | 15 |
|---|---|---|
| Heat Sag (6"/250° F.) | 32 | 21 |
| Heat Sag (4"/325° F.) | 32 | 22 |
| Notched Izod (ftlb/in) | 5.7 | 8.6 |
| Elongation % | 340 | 270 |
| Tensile Strength, (lb/in$^2$) | 4,000 | 3,900 |
| Tear Strength (pli) | 440 | 425 |

TABLE 3

| Example | 16 | 17 |
|---|---|---|
| B-Side | | |
| DETDA | 35 | 35 |
| POLYOL E | 3.8 | 3.8 |
| IMR A | 3 | 3 |
| L-5304 | 0.4 | 0.4 |
| AMINE A | 2.2 | 2.2 |
| POLYOL D | 55.2 | 55.2 |
| UL-28 | 0.2 | 0.2 |
| Dabco 33-LV | 0.2 | 0.2 |
| A-SIDE | | |
| ISO | 12 | 9 |
| NCO Index | 105 | 105 |
| Moles Urethane/100 g | 0.0442 | |
| Moles Allophanate/100 g | | 0.0442 |
| Props. of Molded Article | | |
| Flex Mod. at rm. temp. (lb/in$^2$) | 33,400 | 41,200 |
| Heat Sag (6"/250° F.) | 24 | 22 |
| Heat Sag (4"/325° F.) | 24 | 28 |
| Notched Izod (ftlb/in) | 8.9 | 9.9 |
| Elongation % | 280 | 260 |
| Tensile Strength, (lb/in$^2$) | 3,840 | 4,000 |
| Tear Strength (pli) | 480 | 460 |

TABLE 4

| Example | 18 | 19 |
|---|---|---|
| B-Side | | |
| DETDA | 40 | 40 |
| POLYOL E | 4.3 | 4.3 |
| IMR A | 3.4 | 3.4 |
| L-5304 | 0.4 | 0.4 |
| AMINE A | 2.5 | 2.5 |
| POLYOL D | 49.1 | 49.1 |
| UL-28 | 0.2 | 0.2 |
| Dabco 33-LV | 0.3 | 0.3 |
| A-SIDE | | |
| ISO | 12 | 9 |
| NCO Index | 105 | 105 |
| Moles Urethane/100 g | 0.0442 | |
| Moles Allophanate/100 g | | 0.0442 |
| Props. of Molded Article | | |
| Flex Mod. at rm. temp. (lb/in$^2$) | 41,430 | 50,600 |
| Heat Sag (6"/250° F.) | 19 | 16 |
| Heat Sag (4"/325° F.) | 21 | 19 |
| Notched Izod (ftlb/in) | 10.5 | 10.8 |
| Elongation % | 280 | 225 |
| Tensile Strength, (lb/in$^2$) | 4,100 | 4,100 |
| Tear Strength (pli) | 525 | 500 |

TABLE 5

| Example | 20 | 21 | 22 |
|---|---|---|---|
| B-Side | | | |
| DETDA | 30 | 30 | 30 |
| POLYOL E | 3.8 | 3.8 | 3.8 |
| IMR A | 3 | 3 | 3 |
| L-5304 | 0.4 | 0.4 | 0.4 |
| AMINE A | 1.7 | 1.7 | 1.7 |
| POLYOL D | 60.5 | 60.5 | 60.5 |
| UL-28 | 0.3 | 0.3 | 0.3 |
| Dabco 33-LV | 0.1 | 0.1 | 0.1 |
| A-SIDE | | | |
| ISO | 13 | 11 | 10 |
| NCO Index | 105 | 105 | 105 |
| Moles Urethane/100 g | 0.1141 | | |
| Moles Allophanate/100 g | | 0.0896 | 0.0913 |
| Props. of Molded Article | | | |
| Flex Mod. at rm. temp. (lb/in$^2$) | 52,200 | 68,300 | 65,400 |
| Heat Sag (6"/250° F.) | 32 | 20 | 26 |
| Heat Sag (4"/325° F.) | 41 | 40 | 44 |
| Notched Izod (ftlb/in) | 12.3 | 10.2 | 9.8 |
| Elongation % | 270 | 190 | 210 |
| Tensile Strength (lb/in$^2$) | 4,800 | 4,200 | 3,800 |
| Tear Strength (pli) | 540 | 540 | 520 |

TABLE 6

| Example | 23 | 24 | 25 |
|---|---|---|---|
| B-Side | | | |
| DETDA | 35 | 35 | 35 |
| POLYOL E | 3.8 | 3.8 | 3.8 |
| IMR A | 3 | 3 | 3 |
| L-5304 | 0.4 | 0.4 | 0.4 |
| AMINE A | 2.2 | 2.2 | 2.2 |
| POLYOL D | 55.2 | 55.2 | 55.2 |
| UL-28 | 0.2 | 0.2 | 0.2 |
| Dabco 33-LV | 0.2 | 0.2 | 0.2 |
| A-SIDE | | | |
| ISO | 13 | 11 | 10 |
| NCO Index | 105 | 105 | 105 |
| Moles Urethane/100 g | 0.1141 | | |
| Moles | | 0.0896 | 0.0913 |

TABLE 6-continued

| Example | 23 | 24 | 25 |
|---|---|---|---|
| Allophanate/ 100 g | | | |
| Props. of Molded Article | | | |
| Flex. Mod. at rm. temp. (lb/in²) | 67,740 | 80,200 | 80,500 |
| Heat Sag (6"/250° F.) | 10 | 12 | 24 |
| Heat Sag (4"/325° F.) | 30 | 34 | 37 |
| Notched Izod (ftlb/in) | 12.4 | 7.9 | 7 |
| Elongation % | 210 | 150 | 200 |
| Tensile Strength (lb/in²) | 4,700 | 4,200 | 4,100 |
| Tear Strength (pli) | 570 | 590 | 540 |

TABLE 7

| Example | 26 | 27 | 28 |
|---|---|---|---|
| B-Side | | | |
| DETDA | 40 | 40 | 40 |
| POLYOL E | 4.3 | 4.3 | 4.3 |
| IMR A | 3.4 | 3.4 | 3.4 |
| L-5304 | 0.4 | 0.4 | 0.4 |
| AMINE A | 2.5 | 2.5 | 2.5 |
| POLYOL D | 49.1 | 49.1 | 49.1 |
| UL-28 | 0.2 | 0.2 | 0.2 |
| Dabco 33-LV | 0.3 | 0.3 | 0.3 |
| A-SIDE | | | |
| ISO | 13 | 11 | 10 |
| NCO Index | 105 | 105 | 105 |
| Moles Urethane/ 100 g | 0.1141 | | |
| Moles Allophanate/ 100 g | | 0.0896 | 0.0913 |
| Props. of Molded Article | | | |
| Flex Mod. at rm. temp. (lb/in²) | 74,000 | 98,520 | 86,000 |
| Heat Sag (6"/250° F.) | 13 | 6 | 14 |
| Heat Sag (4"/325° F.) | 30 | 21 | 36 |
| Notched Izod (ftlb/in) | 10.7 | 7.2 | 5.7 |
| Elongation % | 170 | 140 | 140 |
| Tensile Strength (lb/in²) | 4,500 | 4,500 | 3,900 |
| Tear Strength (pli) | 620 | 600 | 500 |

RIM Example 14 uses comparative Isocyanate 12 and has the same B side blend as the invention Isocyanate 9 used in RIM Example 15. The urethane free Isocyanate 9 shows a substantial increase in flex modulus while maintaining a good balance of overall elastomer properties. This is confirmed by RIM Examples 16 and 17 as well as 18 and 19 which have been setup for a similar comparison. These urethane free isocyanates may therefore be used with a lower extender (DETDA) level to achieve a target flex modulus. This gives two important advantages. The first is cost savings as the diamine extender is the most expensive ingredient in these systems. The second is a wider processing (more forgiving) window due to the decreased reactivity of the system due to the reduction of the concentration of the most reactive species on the B side, the diamine extender. It is important to emphasize that all these advantages are present when comparing the two prepolymers on a level playing field, i.e., at the same molar concentration of isocyanate modification (Isocyanate 12 has 0.0442 moles urethane groups/100 g of prepolymer, Isocyanate 9 has 0.0442 moles allophanate groups/100 g of prepolymer).

Although the invention has been described in detail in the foregoing for the purpose of illustration, it is to be understood that such detail is solely for that purpose and that variations constituting other embodiments can be made therein by those skilled in the art without departing from the spirit and scope of the invention except as it may be limited by the claims.

What is claimed is:

1. A process for the production of a stable, liquid allophanate-modified diphenylmethane diisocyanate comprising
   (a) reacting
      (1) an organic material having about 1.8 or more hydroxyl groups and a molecular weight of from about 60 to 6,000
      with
      (2) a monoisocyanate in an amount such that the reaction product could possibly include unreacted hydroxyl groups or isocyanate groups,
   and subsequently
   (b) reacting
      (3) the reaction product of (a)
      with
      (4) a mixture of isomers of diphenylmethane diisocyanate which is made up of
         (i) from about 0 to about 60% by weight of the 2,4'-isomer,
         (ii) less than 6.0% by weight of the 2,2'-isomer, and
         (iii) from about 34 to about 100% by weight of the 4,4'-isomer,
   in amounts such that a liquid, urethane-free, allophanate-modified MDI having an isocyanate content of from about 3 to about 28% is formed.

2. The process of claim 1 in which 1 equivalent of organic material (1) is present for every equivalent of monoisocyanate (2) present.

3. The process of claim 1 in which reaction (a) is carried out at a temperature of from about 60° to about 150° C.

4. The process of claim 1 in which reaction (b) is carried out at a temperature of from about 60° to about 120° C.

5. The process of claim 1 wherein said organic material (1) contains two hydroxyl groups.

6. The process of claim 1 wherein said monoisocyanate (2) is selected from the group consisting of phenyl isocyanate, dimethylphenyl isocyanate, tolylisocyanate and cyclohexylisocyanate.

7. The process of claim 1 in which zinc acetylacetonate is present during reaction (b).

8. The process of claim 1, wherein the formed liquid, urethane-free, allophanate-modified MDI has an isocyanate content of from about 8 to about 23%.

9. A stable, liquid allophanate-modified diphenylmethane diisocyanate produced by the process of claim 1.

10. A process for the production of a molded elastomer by a reaction injection molding process comprising
   a) combining the allophanate-modified prepolymer of MDI produced by the process of claim 1 with an isocyanate-reactive material and b) injecting the mixture made in a) into a mold,
c) allowing the mixture injected in step b) to react, and
d) removing the reaction product formed in c) from the mold.

11. The molded elastomer produced by the process of claim 10.

* * * * *